(12) United States Patent
Budinski et al.

(10) Patent No.: US 6,363,747 B1
(45) Date of Patent: Apr. 2, 2002

(54) GLASS MOLD MATERIAL FOR PRECISION GLASS MOLDING

(75) Inventors: Michael K. Budinski, Pittsford; John C. Pulver, Spencerport; Jayson J. Nelson, Webster; Eugene G. Hill; David A. Richards, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/570,564

(22) Filed: May 12, 2000

(51) Int. Cl.[7] ................................................ C03B 11/00
(52) U.S. Cl. ................... 65/26; 65/37; 65/102; 65/106; 65/33.7; 65/169; 65/286; 65/305; 65/374.13
(58) Field of Search .......................... 65/26, 33.7, 102, 65/37, 106, 169, 286, 305, 374.13

(56) References Cited

U.S. PATENT DOCUMENTS 5,762,676 A * 6/1998 Richards ....................... 65/102

* cited by examiner

Primary Examiner—James Derrington
(74) Attorney, Agent, or Firm—Mark G. Bocchetti

(57) ABSTRACT

A method for making working mold tools for use in a compression molding process for molding optical glass elements from high temperature glasses having $T_g$'s in the range of from about 400° C. to about 850° C. An yttria aluminosilicate glass is fabricated by traditional melting and casting processes to thereby make an amorphous base material having a minimum apparent viscosity of $10^{15}$ poise at the temperature at which the optical glass elements are to be molded. A mold preform is made from the base material. A first surface figure for the optical element to be molded with the working mold tool is defined. A second surface figure for a master mold tool and a third surface figure for the working mold tool are computed based upon the first surface figure and the coefficients of thermal expansion of the optical element, the master mold tool, and the working mold tool, the temperature at which the working mold tool is molded, and the temperature at which the optical element is to be molded. A master mold tool is then ground and polished to achieve the second surface figure. The working mold tool is then molded from the mold preform using the master mold tool.

16 Claims, 9 Drawing Sheets

100" C.)
GLASS MOLD MATERIAL FOR PRECISION GLASS MOLDING

FIELD OF THE INVENTION

The present invention relates generally to the molding of optical glass lenses and, more particularly, to methods for producing glass molds from yttria aluminosilicate glasses for molding optical glass elements therewith.

BACKGROUND OF THE INVENTION

Various methods and apparatus for the compression molding of glass optical elements are known in the prior art. With these methods and apparatus, optical element preforms sometimes referred to as gobs are compression molded at high temperatures to form glass lens elements. The basic process and apparatus for molding glass elements is taught in a series of patents assigned to Eastman Kodak Company. Such patents are U.S. Pat. No. 3,833,347 to Engle et al., U.S. Pat. No. 4,139,677 to Blair et al., and U.S. Pat. No. 4,168,961 to Blair. These patents disclose a variety of suitable materials for construction of mold inserts used to form the optical surfaces in the molded optical glass elements. Those suitable materials for the construction of the mold inserts included glasslike or vitreous carbon, silicon carbide, silicon nitride, and a mixture of silicon carbide and carbon. In the practice of the process described in such patents, a glass preform or gob is inserted into a mold cavity with the mold being formed out of one of the above mentioned materials. The molds reside within a chamber in which is maintained a non-oxidizing atmosphere during the molding process. The preform is then heat softened by increasing the temperature of the mold to thereby bring the preform up to a viscosity ranging from $10^7$–$10^9$ poise for the particular type of glass from which the preform has been made. Pressure is then applied to force the preform to conform to the shape of the mold cavity. The mold and preform are then allowed to cool below the glass transition temperature of the glass. The pressure on the mold is then relieved and the temperature is lowered further so that the finished molded lens can be removed from the mold.

U.S. Pat. Nos. 4,897,101 and 4,964,903, both to Carpenter et al., teach a method and apparatus for molding optical glass elements using molded glass molds. According to such method and apparatus, a metal master mold is first manufactured. Suitable materials for forming such master are Inconel 718, stainless steel type 420, tungsten carbide, and the like. The master surfaces may be coated or plated to minimize degradation of the molding surface through chemical attack, corrosion, denting, abrasion or adherence of the material being molded. Lens design data is apparently used to calculate the profile of the surface of the master. It is stated that the profile compensates for the different coefficient of thermal expansion of the lens and mold materials at the forming temperature to generate the required mold figure. Because Carpenter et al. teaches the use of metal master tooling, the process and method taught thereby is temperature limited. The glass molds formed with the metal tools must be made from glass having a relatively low molding temperatures (less than about 500° C.). As a result, lenses molded using such glass molds must have a molding temperature that is even lower than that of the glass mold. The glass is taught as being acceptable for use with such glass molds had $T_g$ no greater than 402° C. Thus, the commercial viability of such method and apparatus of Carpenter et al. is, at best, questionable given the limited types of glass which may be used to mold glass optical elements using such method and apparatus. Indeed, there are very few commercially available glasses which can be used in the practice of such method and apparatus. As a result, apparently Carpenter et al found it necessary to develop new optical glass compositions that could be used with their method and apparatus. To date, only one commercially available optical glass, Coming C0550, meets the above requirements.

The use of glass molds has many benefits. Because the glass molds are replicated from a master mold of the inverse shape, the glass molds produced from the master will inherently have less dimensional variability. Glass molds are also more cost effective compared with diamond turned molds or ground and polished molds such as silicon carbide. A population of molds for multiple cavity manufacturing may be fabricated very quickly from glass molds compared with single-point turned molds or traditional ground and polished hard materials such as silicon carbide.

SUMMARY OF THE INVENTION

It is therefore an object of the present invention to provide a method for forming glass molding tools using an amorphous base material from which a working mold can be formed, wherein the working mold can be used to mold optical glass elements from glasses having a molding temperature in the range of from about 400° C. to about 825° C.

Another object of the present invention is to provide a method for forming glass molding tools from an amorphous material having a short or fragile viscosity curve characteristic.

It is a further object of the present invention to provide a method for making molded glass tools for use in molding optical glass elements wherein the base material used to mold the glass tool has a coefficient of thermal expansion in the range of from about $25 \times 10^7/°$ C. to about $70 \times 10^7/°$ C.

Yet another object of the present invention is to provide a method for making molded glass tools for use in molding optical glass elements wherein the coefficient of thermal expansion of the material of the mold tool preform may be altered from about $25 \times 10^{-7}/°$ C. to about $70 \times 10^{-7}/°$ C. without significantly altering the glass transition temperature or temperature for at which the glass material has a viscosity of at least about $10^{15}$ poise.

Briefly stated, these and numerous other features, objects and advantages of the present invention will become readily apparent upon a reading of the detailed description, claims and drawings set forth herein. These features, objects and advantages are accomplished by first making a master molding tool from a material having a maximum use temperature in the range of from about 900° C. to about 2500° C. The preferred material for this purpose is silicon carbide, produced by chemical vapor deposition. Other materials which can be used to fabricate the master mold tool include Vycor®, fused silica, fused quartz, and various oxide, nitride, carbide, silicide, and boride ceramics and composites thereof The master tool is produced on computer-controlled grinding and polishing equipment to a very high degree of accuracy (peak to valley of 0.015 μm). This master tool is, in turn, used in a glass molding process to produce working tools of opposite curvature. The working tools are then used to fabricate the finished optical glass lenses in a production mode. The method includes the calibration of curves and for a two-step molding process where the three materials (master tool, working tool, and lens) have different coefficients of thermal expansion and are used at two different temperatures (tool process and lens process). This is particularly important for aspheric surfaces. The system requires the identification of a hierarchy of glasses such that the working tool glass has a strain point above the process temperature for the lens glass. If the strain point of the working tool is not greater than the process temperature of the lens glass, curve creep will result as the working tool deforms a little with each molding cycle. An appropriate release agent is also required.

As stated above, once the master tool has been created, it is used to mold the working tool. Since the lenses ultimately to be molded through the use of the working tool have a molding temperature in the range of from about 400° C. to about 825° C., the working tool should have a $T_g$ or strain point that is at least about 50° C. greater than the molding temperature of the glass lenses. An amorphous-based oxide glass containing yttria, alumina, and silica is formulated to have a predetermined CTE. Such glass, called yttria aluminosilicate (YAS) glass, is very refractory with $T_g$'s ranging from about 880° C. to about 910° C. It has been surprisingly found that yttria aluminosilicate glasses have very short viscosity characteristics which allow for the fabrication of bubble-free melts for high-quality cast slabs. Furthermore, the composition of yttria aluminosilicate glasses may be adjusted to yield glasses with coefficients of thermal expansion that range from about $25 \times 10^{-7}/°$ C. to about $70 \times 10^{-7}/°$ C. without significantly altering the glass transition temperature of the glass. The term "significantly" as used herein with regard to altering glass transition temperature is intended to mean not more than about ±25° C. Preferably, the composition of yttria aluminosilicate glasses may be adjusted to yield glasses with coefficients of thermal expansion that range from about $25 \times 10^{-7}/°$ C. to about $70 \times 10^{-7}/°$ C. with only about a ±10° C. variation in $T_g$. Further, such YAS glass has a viscosity of less than about $10^2$ poise at a temperature of less than about 1200° C. A preform made of the YAS glass is molded to yield a working mold tool therefrom. This results in a working mold tool that includes a molded optical element forming surface, and that has a viscosity of at least about $10^{15}$ poise at the molding temperature the glass optics to be molded therewith. The YAS working mold tool is then used to mold glass optical elements such as lenses with the molded optical element forming surface. The CTE and geometry of the glass optical elements are used to determine a desired range for the predetermined CTE of the YAS glass. Other rare earth glasses may potentially be used in the practice of method of the present invention in place of yttria aluminosilicate glasses.

Preferably, the composition of rare earth and yttria aluminosilicate glasses may be adjusted to yield glasses with coefficients of thermal expansion that range from about $25 \times 10^{-7}/°$ C. to about $70 \times 10^{-7}/°$ C. also without significantly altering the temperature at which the rare earth and yttria aluminosilicate glasses have a viscosity of at least about $10^{15}$. Again, the term "significantly" as used herein with regard to altering the temperature at which the rare earth and yttria aluminosilicate glasses have a viscosity of at least about $10^{15}$ is intended to mean not more than about ±25° C.

A first surface figure for the optical element to be molded with the working tool is defined. A second surface figure is computed for the master tool. A third surface figure for the working tool is then calculated based upon the first surface figure and the coefficient of thermal expansion of the optical element, the master tool, and the working tool, as well as the temperature at which the working tool is molded and the temperature at which the optical element or lens is to be molded. The master tool is ground and polished to achieve the second surface figure. A release coating is applied to the master tool and the master tool is used to mold the working tool.

DETAILED DESCRIPTION OF THE INVENTION

Figure 1:
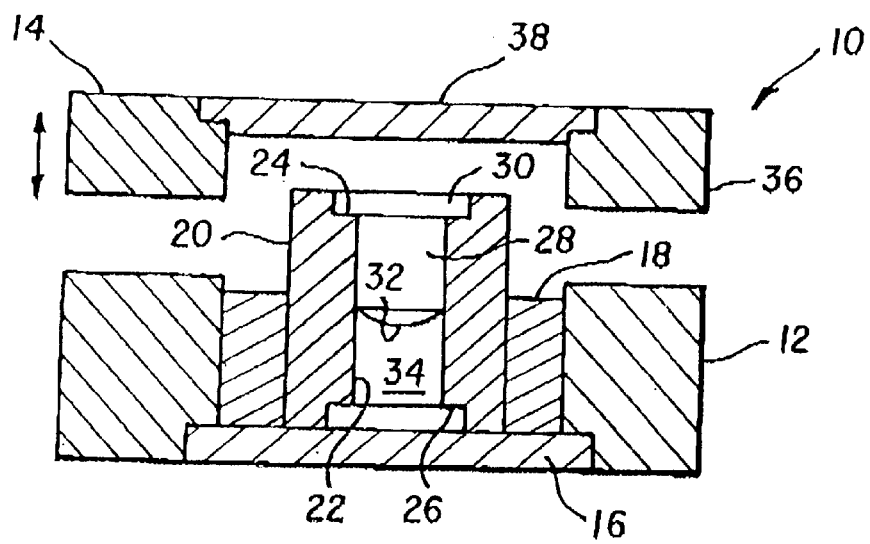
FIG. 1 is a cross-sectional schematic of a mold assembly for use in the practice of the present invention.
Figure 2:
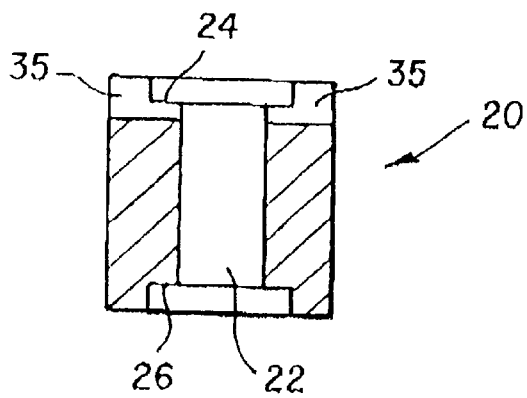
FIG. 2 is a cross-sectional view of the mold super ring.

Turning first to FIG. 1, there is shown a mold assembly 10 in cross-section used to form the glass molding tools of the present invention. The mold assembly 10 includes a lower mold housing 12 and an upper mold housing 14. At the base of lower mold housing 12 is a hearth plate 16. Supported on hearth plate 16 within lower mold housing 12 is spacer sleeve 18. Also supported on hearth plate 16 is mold super ring 20 which mounts within spacer sleeve 18. Mold super ring 20 includes a cylindrical opening 22 therethrough having a cylindrical axis which is substantially collinear with the cylindrical axis of mold super ring 20. Mold super ring 20 further includes an upper and a lower counter bore which have cylindrical axes which are collinear with the cylindrical axis of cylindrical opening 22 thereby resulting in an upper annular shoulder 24 and a lower annular shoulder 26. (See FIG. 2.) Supported within mold super ring 20 is master mold tool 28. Master mold tool 28 includes an annular flange 30 which projects radially to engage upper annular shoulder 24 thereby suspending master mold tool 28 within mold super ring 20. At the lower end of master mold tool 28 is mold surface 32. In such manner, there is created a mold cavity 34 defined at the lower end by hearth plate 16, peripherally by mold super ring 20, and at the upper end thereof by mold surface 32.

Upper mold housing 14 includes a cylindrical member 36 aligned with lower mold housing 12. Mounted to cylindrical member 36 is a pusher plate 38.

In operation, a glass preform is inserted within the mold cavity 34 and the master mold tool 28 is inserted into the mold super ring 20. Means not shown are employed to drive upper mold housing 14 downward causing pusher plate 38 to engage the upper surface of master mold tool 28. The glass preform and mold have already been heated to above the $T_g$ (glass transition temperature) of the glass used to make the glass preform. In such manner, the glass preform is forced to conform to the shape of the mold cavity 34.

It is not sufficient to achieve accurate surfaces in molding if the surfaces of the molding element are not properly aligned to one another. This is particularly true for aspheric surfaces where no realignment of the lens assembly can remove the error completely. A mastering system for molding mold tools has a more difficult task in this respect than direct molding of lens elements. Nevertheless, with proper care and tolerancing of tools, very good results can be achieved.

The spacer sleeve 18 is particular to a given master mold tool 28 and the glass mold tool to be generated therewith. In such manner, the spacer sleeve 18 allows the same mold assembly 10 to be used to run different sized mold super rings 20 and, thus, different sized master mold tools 28.

The material for hearth plate 16 is chosen for its conductive heating characteristics while the material for the pusher plate 38 is chosen for its mechanical strength. Many alternatives may be contemplated for these materials but the preferred material for hearth plate 18 is carbon (for example, P-03 graphite as manufactured by Pure Carbon Company of St. Mary's Pa.) and the preferred material for pusher plate 38 is steel.

Figure 3:
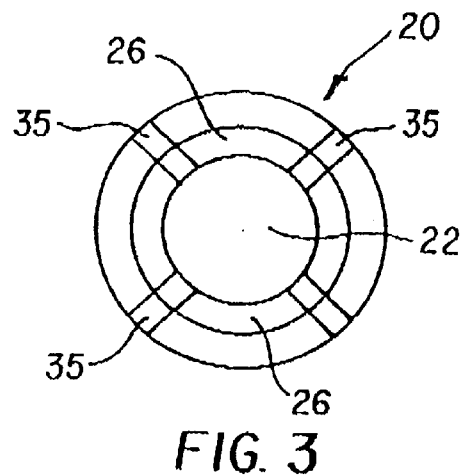
FIG. 3 is a top plan view of the mold super ring.

Release of the molded glass tool is also a consideration. The mold super ring 20 is made of carbon (P-03 graphite) or Vycor® to exacting tolerances at the cylindrical axis of cylindrical opening 22 must align with the cylindrical axis of master mold tool 28 which, in turn, must align with the cylindrical axis of the glass mold tool to be made within mold cavity 34. In use, the mold assembly 10 is assembled as shown in FIG. 1 except that the glass preform is placed in the bottom of mold super ring 20 on hearth plate 16. The master mold tool 28 is then loaded into mold super ring 20 over the glass preform. The mold assembly is heated and forced to close after achieving the appropriate temperature. FIG. 1 shows the mold assembly in an open position after pressing has occurred. There are slots 35 (see FIG. 3) in the top of the mold super ring 20 that extend below the master mold tool flange 30 to allow for extraction of the master mold tool 28 from the mold super ring 20. The master mold tool 28, the glass mold tool 40 formed therewith, and the mold super ring 20 are removed from mold assembly 10 after cooling. The master mold tool 28 is then extracted and the glass mold tool 40 is pushed out the bottom of mold super ring 20 (if necessary). The mold assembly 10 is then ready for use again.

Figure 4:
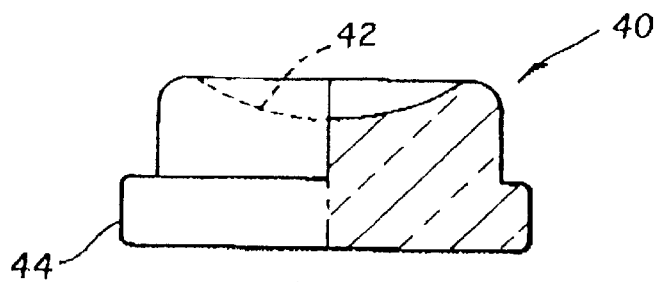
FIG. 4 is a side elevation/partial section view of a glass working mold tool.
Figure 5:
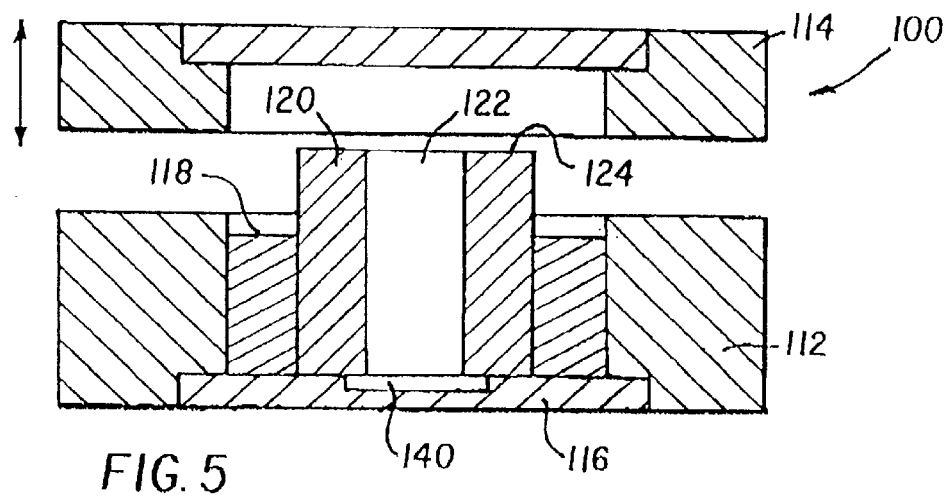
FIG. 5 is a cross-sectional schematic of an alternative embodiment mold assembly for use in the practice of the present invention with the master mold tool removed therefrom.
Figure 6:
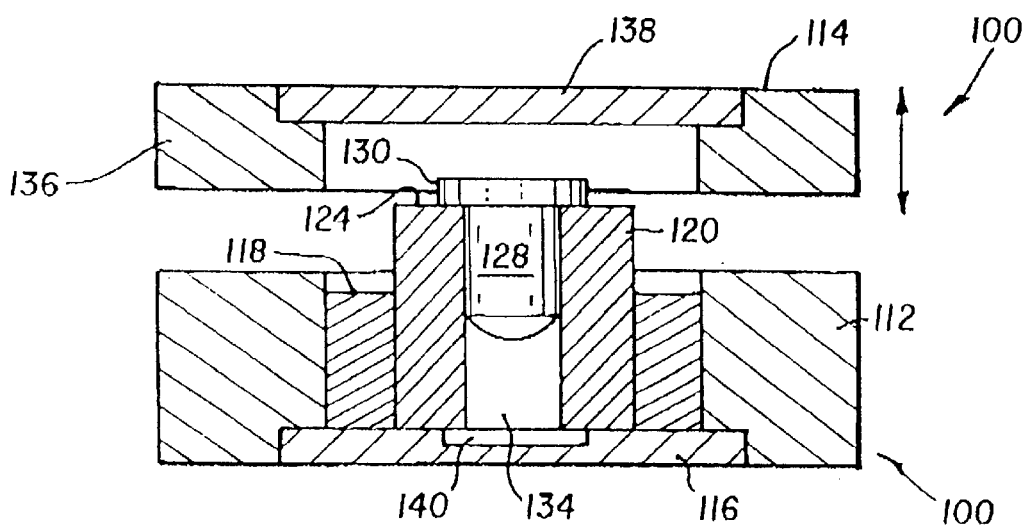
FIG. 6 is a cross-sectional schematic of the alternative embodiment mold assembly of FIG. 5 with the master mold tool inserted therein but not shown in section.
Figure 7:
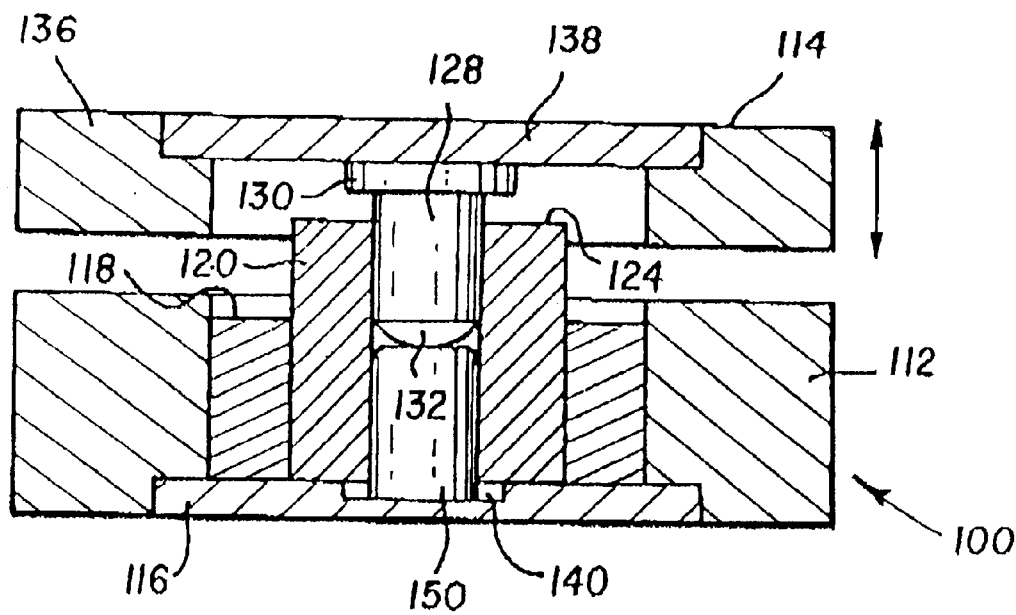
FIG. 7 is a cross-sectional schematic of an alternative embodiment mold assembly of FIG. 5 with the master mold tool and a glass preform inserted therein (not in section) and with the upper mold housing lowered to engage the master mold tool.
Figure 8:
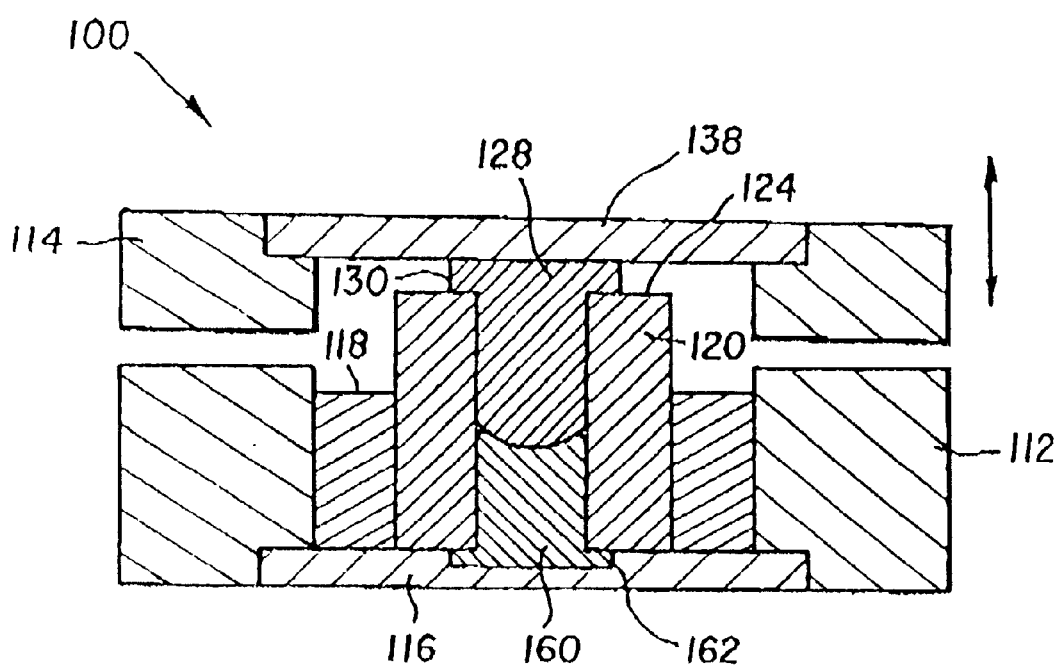
FIG. 8 is a cross-sectional schematic of an alternative embodiment mold assembly of FIG. 5 with the master mold tool and a glass preform inserted therein and with the upper mold housing in a fully lowered position.

Looking at FIG. 4, there is shown in partial cross-section an example of a glass working mold tool 40 made with the mold assembly 10 depicted in FIG. 1. The glass working mold tool 40 includes a mold surface 42 which may be aspherical. The glass working mold tool 40 further includes an annular flange portion 44 extending radially therefrom.

Turning to FIGS. 5 through 8, there is shown an alternative embodiment of the mold assembly depicted in FIG. 1. The mold assembly 100 includes a lower mold housing 112 and an upper mold housing 114. At the base of lower mold housing 112 is a hearth plate 116. Supported on hearth plate 116 within lower mold housing 112 is spacer sleeve 118. Also supported on hearth plate 116 is mold super ring 120 which mounts within spacer sleeve 118. Mold super ring 120 includes a cylindrical opening 122 therethrough having a cylindrical axis which is substantially collinear with the cylindrical axis of mold super ring 120. Supported within mold super ring 120 is master mold tool 128 (see FIGS. 6 through 8). Master mold tool 128 includes an annular flange 130 which projects radially to engage upper annular surface 124 of mold super ring 120 when master mold tool 128 is fully inserted into cylindrical opening 122. At the lower end of mold tool 128 is mold surface 132. In such manner, there is created a mold cavity 134 defined at the lower end by hearth plate 116, peripherally by mold super ring 120, and at the upper end thereof by mold surface 132. Upper mold housing 114 includes a cylindrical member 136 aligned with lower mold housing 112. Mounted to cylindrical member 136 is a pusher plate 138. This alternative mold assembly 100 differs from the mold assembly 10 chiefly in the configuration of the mold super ring 120 and in the configuration of the hearth plate 116. By creating a recess 140 in hearth plate 116 to accommodate the formation of a flange at the base of the working tool and by suspending master mold tool 128 from the annular flange 130 extending therefrom, mold super ring 120 becomes a plain cylindrical shape with a single cylindrical opening 122 therethrough.

In operation, a generally cylindrical preform 150 is inserted into cylindrical opening 122 to rest upon hearth plate 116. Master mold tool 128 is then inserted into cylindrical opening 122 such that mold surface 132 rests on preform 150 (see FIG. 7). After the mold assembly is heated to the predetermined temperature, upper mold housing 114 is moved vertically downward such that pusher plate 138 engages the top surface of the master mold tool 128. In such manner, master mold tool 128 is driven downward into cylindrical opening 122 until annular flange 130 engages the upper annular surface 124 of mold super ring 120 resulting in preform 150 being forced to conform to the shape of mold cavity 134 (see FIG. 8). Preform 150 thus becomes a working mold tool 160 with an annular flange 162 and a generally concave molding surface.

The method of the present invention employs the use of a mastering system to produce glass molding tools which are ultimately used for molding finished optical glass elements. The master mold tool 28 is produced on a computer-controlled grinding apparatus to a very high degree of accuracy (peek to valley of 0.15 μm). An example of an acceptable of a computer-controlled grinding apparatus is the Ultra 2000 as manufactured by Rank Pneumo of Keene, N.H. The master mold tool 28 is then polished to reduce surface roughness as a result of the grinding operation. Polishing may be performed with a polishing machine such as is manufactured by Loh Optik Maschinen AG of Wetzlar, Germany. The master mold tool 28, once fabricated, is, in turn, used in a glass molding process in the same molding machines used to make the finished glass optical elements. In such manner, the master mold tool 28 is used to produce a glass mold tool 40 wherein the glass mold tool 40 has a mold surface 42 of opposite curvature to the curvature of mold surface 32 of master mold tool 28. Glass mold tools 40 are then used to fabricate the finished lenses in a production mode.

The method includes the calibration of curves for the two-step molding process where the master mold tool 28, the glass mold tool 40, and the finished lens are made from three different materials having different coefficients of thermal expansion. In addition, different working temperatures are involved. The temperature at which the master mold tool 28 is used to form the glass mold tool 40 is necessarily higher than the temperature at which the glass mold tool 40 is used to mold the finished lens. The calibration of curves is particularly important for aspheric surfaces and the system of the present invention requires the identification of a hierarchy of glasses such that the material of the glass mold tool 40 has a strain point above the process temperature at which the finished lenses are formed. If this is not the case, curve creep will be the result as the mold surface 42 moves a little with each mold cycle. An appropriate release agent is also required in the molding operations.

The calibration of curves (lens and mold surfaces) is based on simple first order theory of expansion and the assumption that the materials involved are isotropic. It requires the empirical data of the materials and processes, namely, the coefficients of thermal expansion that apply for the temperatures of the processes, and the design coefficients of the desired lens curve(s).

First order expansion theory states that the fractional change in a linear dimension of a body is directly proportional to its change in temperature. This can be stated mathematically as:

$$\frac{\Delta L}{L_o} = \alpha \cdot \Delta T \qquad \text{Equation (1)}$$

where the constant of proportionality is called the linear coefficient of thermal expansion (CTE) and is determined experimentally. $\Delta L$ is the change in length, $L_{10}$ is the original length, and $\Delta T$ is the change in temperature from process to ambient. It has been empirically determined that for most optical glasses, the process temperature minus 40° C. is a good measure of this for a glass molding process. Twenty of these degrees represent ambient (room temperature ~20° C.) and the other twenty degrees can be thought of as the decrement from the molding temperature to the point where the glass has its structural integrity so to speak. In other words, the glass at this point has a surface which is self-supporting independent of the tool. $\alpha$ has units of reciprocal temperature. If $\Delta L = L - L_0$ then Equation (1) can be cast in another form:

$$L = L_0(1 + \alpha \cdot \Delta T) \qquad \text{Equation (2)}$$

where L is the length at final temperature. This applies to all linear dimensions of isotropic materials where the behavior in the temperature regime can be described by a constant CTE. Expansion behavior at intermediate temperatures need not be considered. Only the expansion behavior at the temperature end points is of concern. Therefore, an $\alpha$ which is not necessarily a handbook value can be defined that satisfies Equation (2). Because radius is a linear dimension, it can be described by Equation (3) thus:

$$R_T = R_L(1 + \alpha_G \cdot \Delta T) \qquad \text{Equation (3)}$$

where $R_T$ is the radius of the lens at the operating temperature of the process, $R_L$ is the desired radius of the lens at ambient temperature, $\alpha_G$ is the equivalent linear coefficient of thermal expansion of the glass and $\Delta T$ is the difference in temperature (process to ambient). This is made use of in conjunction with a similar equation for the working tool material, and the recognition that replication occurs at the elevated temperature and not at ambient temperature. Therefore, $$R_T = R_N(1 \alpha_N \cdot \Delta T) \qquad \text{Equation (4)}$$

where $R_N$ is the ambient radius of the working tool and $\alpha_N$ is the CTE of the working tool material and $$R_N = R_L \cdot \frac{(1 + \alpha_G \cdot \Delta T)}{(1 + \alpha_N \cdot \Delta T)} \qquad \text{Equation (5)}$$

or $$R_N = R_L \cdot K_N^L \qquad \text{Equation (6)}$$

For aspheres the corrections are made on the basis of dimensional analysis. For example, a typical design equation for aspheric surfaces is given by $$X = \frac{CY^2}{1 + \sqrt{\{1 - (K+1)C^2Y^2\}}} + DY^4 + EY^6 + FY^8 + GY^{10} \qquad \text{Equation (7)}$$

where X is the sag at half-aperture ordinate Y, K is the conic constant (a shape factor which is dimensionless), D, E, F and G are the so-called aspheric deformation constants. C is the vertex curvature and is equivalent to the reciprocal of the vertex radius, R. To transform Equation (7) from one describing a lens surface to one describing a nubbin surface, the factor $K_N^L$ from Equation (6) is used according to the dimensionality of the constant being transformed. K is a shape factor with no dimensions. Therefore, it remains the same (a parabola remains a parabola). C has units of reciprocal length. Therefore, it is transformed by dividing by $K_N^L$. D has units of reciprocal length cubed. Therefore, it is divided by $K_N^L$ cubed, and so forth.

For a mastering system this calibration is taken one step further where the master tool is now the working tool and the working tool is the glass pseudo-lens. Of course, different material and temperature constants are used in this iteration.

Because the method of the present invention involves making optical glass elements from glass preforms, the apparent viscosity of the glass mold tool 40 must be at least about $10^{15}$ poise at the molding temperature of the optical glass lens preforms. Since the optical glass lens preforms of interest for use with the method of the present invention have molding temperatures in the range of about 400° C. to about 825° C., it is necessary to mold the glass mold tool 40 from a material with a relatively high $T_g$ and $T_m$ (where $T_m$ is the temperature at which the material has a viscosity of $10^{15}$ poise). The acceptable materials for molding glass mold tools 40 include high silica glasses such as fused silica, fused quartz, Vycor® and aluminosilicate glasses. Vycor® is a 96 percent silica structural glass. Examples of alumino-silicate glasses include Corning 1723, General Electric GE-180, Mo-Sci YAS-6, and Sem-Com SCE-3+5% $SiO_2$. In order to mold glass mold tools 40 from Vycor® or aluminosilicate glasses, it is necessary to have a master mold tool 22 which does not deform at the molding temperatures of the Vycor® or aluminosilicate glasses. The preferred material for manufacturing the master mold tool 28 is silicon carbide produced by chemical vapor deposition. For producing mold tools 40 from aluminosilicate glasses it is also possible to use fused silica, Vycor®, or other fine grained ceramics with high temperature characteristics such as zirconia or alumina.

As mentioned previously, release agent systems are required for the two different molding operations. Release agent systems are a direct function of the two materials involved and the temperature at which the two materials will be in contact with one another. For flint glasses, the molding temperatures will be on the order of 500° C. For crown glasses, the molding temperatures will be on the order of 700° C. For aluminosilicate glass the molding temperature is on the order of 900° C. For fused silica (or Vycor®)) the mold temperature is on the order of 1500° C. Silicon carbide produced by chemical vapor deposition should retain its structural integrity up to about 2600° C. (in a nitrogen environment).

The preferred coating technique for the application of the tin oxide is spin coating of a Sol-Gel and subsequent baking. There are several possible tin oxide precursors that can be used in this manner. The gel phase allows the user the convenience of minute additives for individual glass tuning. Also, the spin coating technique is less susceptible to pin holes, as for example might occur in evaporative coating. Sputtering is a further option for the application of a tin oxide release agent coating.

The carbon coating can be done in a variety of ways. The preferred method of carbon coating is the pyrolysis of simple hydrocarbon gases such as methane or acetylene. Additional methods are known in the prior art which are alleged to produce a diamond-like carbon. It is preferred to place the release agent on the tool rather than on the preform because the preform surface is remapped during the pressing operation. When the molding process is performed correctly, the curvature of the preform will always be greater than the curvature of the mold surface. In this way, the finished lens will always have a greater surface area then the surface of the preform from which it was made. It is also possible to coat both the preform and the tool with a carbon coating.

In the development of the method of the present invention, experiments have shown that the apparent viscosity of the glass mold tool 40 must be at least about $10^{15}$ poise at the lens molding temperature to ensure that the shape of the optical surface of the mold tool 40 does not change due to viscoelastic creep. As reviewed previously, aside from high silica glasses such as fused silica, the highest molding temperature of any commercially available optical glass is 78° C. (Schott SK5). Hence a glass with a viscosity at least about $10^{15}$ poise at the lens molding temperature is required. Using a safety factor of 40° C. (to accommodate process upsets), a glass with a $10^{15}$ poise viscosity at 825° C. is required. Furthermore, the glass mold 40 material must be deformable and moldable at a temperature below about 1100° C. to preserve the master mold 28 as well as the ancillary mold fixtures and apparatus.

Additionally, the mold glass must have a coefficient of thermal expansion greater than $30 \times 10^{-7}$/° C. and preferably above $50 \times 10^{-7}$/° C. to allow for improved release characteristics from the mold super ring 20. Second, overall tolerances in the mold assembly 10 can be tightened. Third, the choice of the composition of the YAS glass from which to make the glass mold tool 40 can be made to depend upon the coefficient thermal expansion of the glass from which the lenses are to be molded, and whether the surface is to be convex or concave. For example, with regard to release from the mold super ring 20, if the graphite mold super ring 20 has a CTE of $46 \times 10^{-7}$/° C. and the glass mold tool 40 has a CTE of $60 \times 10^{-7}$/° C., then on cool down after pressing, the glass mold tool 40 moves away from the mold super ring 20 for easy separation. With regard to the tightening of tolerances of the mold assembly 10, for example, if the limit of realistic tolerances for the mold assembly 10 for use is a certain value at ambient temperature, and the two materials are similar, at molding temperature the chain of tolerances relating one side of the lens to the other are not improved. However, if the glass mold tool 40 material is of higher expansion than the mold super ring 20 and the master mold tool 28, then the assembly can be dimensioned at ambient such that it will tighten up at the higher molding temperature thereby producing a more accurate finished part.

With regard to allowing the lens glass CTE to govern the choice of material to be used in making the glass mold tool 40, if the intended lens were convex/concave with a $60 \times 10^{-7}$/° C. CTE, it might be desirable to use the a glass with a CTE in the range of 40 to $50 \times 10^{-7}$/° C. as the base material for making the glass molding tool 40 on the convex side and a glass with a CTE in the range of 60 to $70 \times 10^{-7}$/° C. as the base material for making the glass molding tool 40 on the concave side. In this manner, the lens glass will always be moving away from the tool glass on cool down promoting release and a minimum wear by eliminating any potential gripping tendency.

Additionally, the glass for the mold tool 40 should have high hardness and chemical durability for improved polishability as the surface of the preform used to mold the glass mold must have a surface, polished by traditional means, better that 10-5 as measured per MIL-O-13830A. This high surface finish ensures that the lenses replicated from the mold also have excellent surfaces.

It is further required that the glass for the mold tool 40 be readily manufacturable with few bubbles and inclusions after casting as well as minimal property variation due to variation in hydroxyl content. Moisture or humidity in the air (during the glass melting process) can affect the hydroxyl or moisture content in the glass affecting properties such as the glass transition temperature.

Several candidate glasses were considered in this investigation as shown below in Table 1.

TABLE 1

Composition of Candidate Mold Glasses

|  |  | $SiO_2$ | $Al_2O_3$ | $Y_2O_3$ | CaO | MgO | BeO |
|---|---|---|---|---|---|---|---|
| SCE3 + 5% $SiO_2$ | Alkali aluminosilicate | <75 | <25 |  | <5 | <5 | <10 |
| 7810 | Lime aluminosilicate | 75–80 | 15–25 |  | 1–10 |  |  |
| YAS-6 | Yttria aluminosilicate | 33 | 25 | 42 |  |  |  |

The properties of these glasses are shown in Table 2 below.

TABLE 2

Thermal Characteristics of Candidate Mold Glasses

|  | Linear thermal expansion coefficient ($\times 10^7$/° C.) | Glass Transition Tg (° C.) | Maximum use temperature (° C.) ($10^{15}$ poise) | Molding Temperature (° C.) ($10^8$ poise) |
|---|---|---|---|---|
| SCE3 + 5% $SiO_2$ | 36.6 | 807 | 762 | 1052 |
| 7810 | 22.7 | 826 | 810 | 1125 |
| YAS-6 | 55.8 | 850 | 824 | 1016 |

Ideally, fused silica, fused quartz, or other silica glasses such as Vycor® (Corning 7913) would be selected for applications such as glass mold tool 40. However, because of high molding temperatures of such materials (well above 1400° C.) these materials are not compatible with the master molds 28, tools, and apparatus (service life is poor). Furthermore, due to the aforementioned arguments, the low coefficient of thermal expansion of these materials reduces the suitability of these glasses for mold tool 40.

Figure 9:
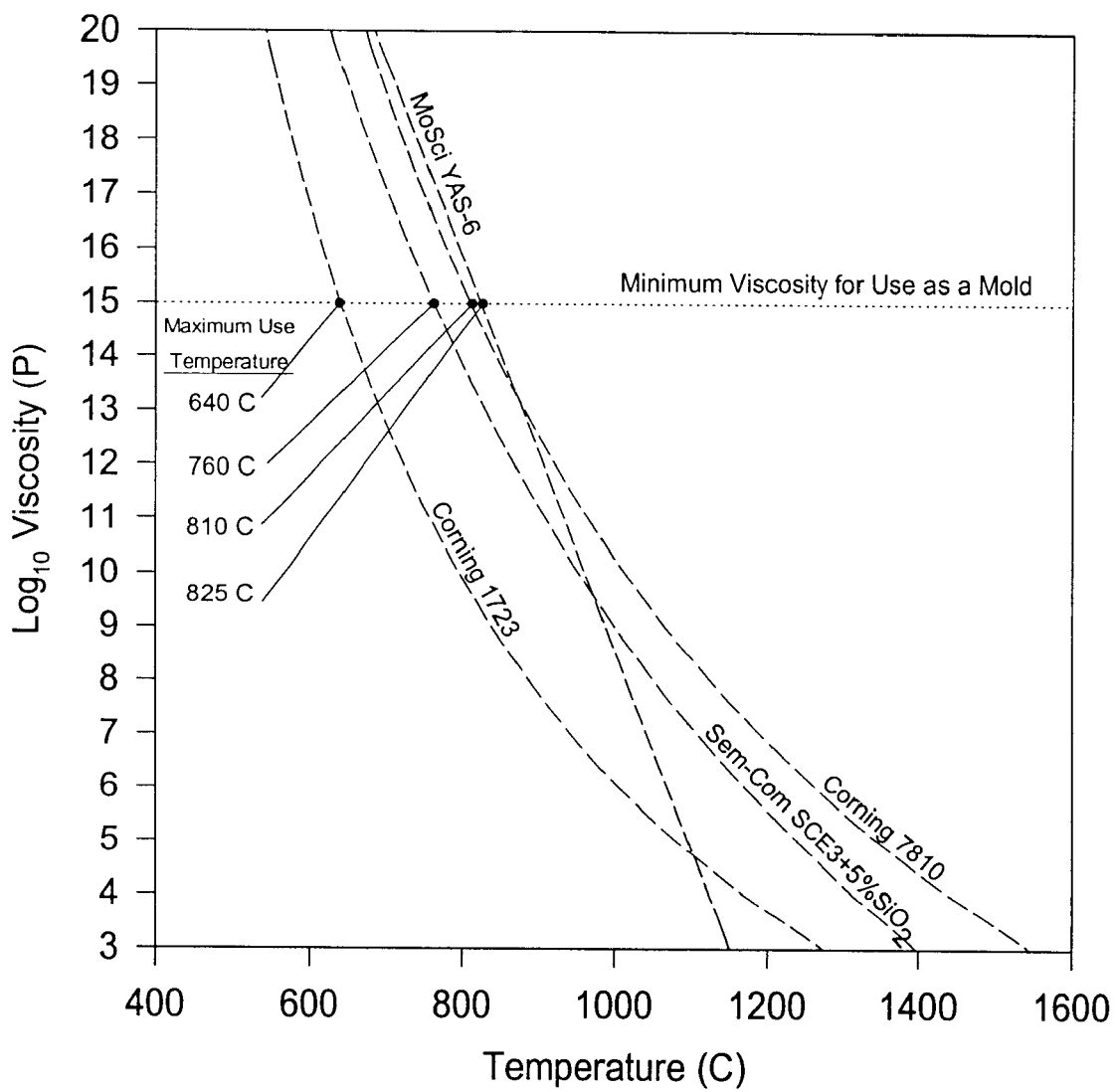
FIG. 9 is a graph comparing the viscosities as a function of temperature for Corning 1723, Mo-Sci YAS-6, Sem-Com SCE-3+5% $SiO_2$, and Corning 7810.

Traditionally, the glass selected for glass mold tool 40 might include glasses from the alkali or alkaline earth aluminosilicate family. Two such glasses, Coring 7810, and Sem-Com SCE3+5% $SiO_2$, were experimentally evaluated. Glass molds were successfully manufactured from these glasses and acceptable optical lenses were molded using these glass mold tool 40. These two glasses were found to be sufficiently refractory to mold optical glasses such as Schott BK7, and Hoya TaC4 without any viscoelastic creep. These glasses, however, have serious drawbacks. The high melt viscosity of these glasses (due to the high silica content) makes it difficult to find bubbles from the melt even when soaked at 1600° C. for 24 hours (see FIG. 9). Special process were developed to yield small batches of bubble-free glass, however, these processes are not readily transferable to large-scale production. The high viscosity also prevents these glasses from being readily cast into usable shapes such as slabs or boules. Typically, because of the high silica content, these glasses have relatively low coefficients of thermal expansion, an undesirable feature in glass for mold tool 40. Additionally, alkali and alkaline earth aluminosilicates have substantial variations in $T_g$ with composition or hydroxyl content.

Figure 10:
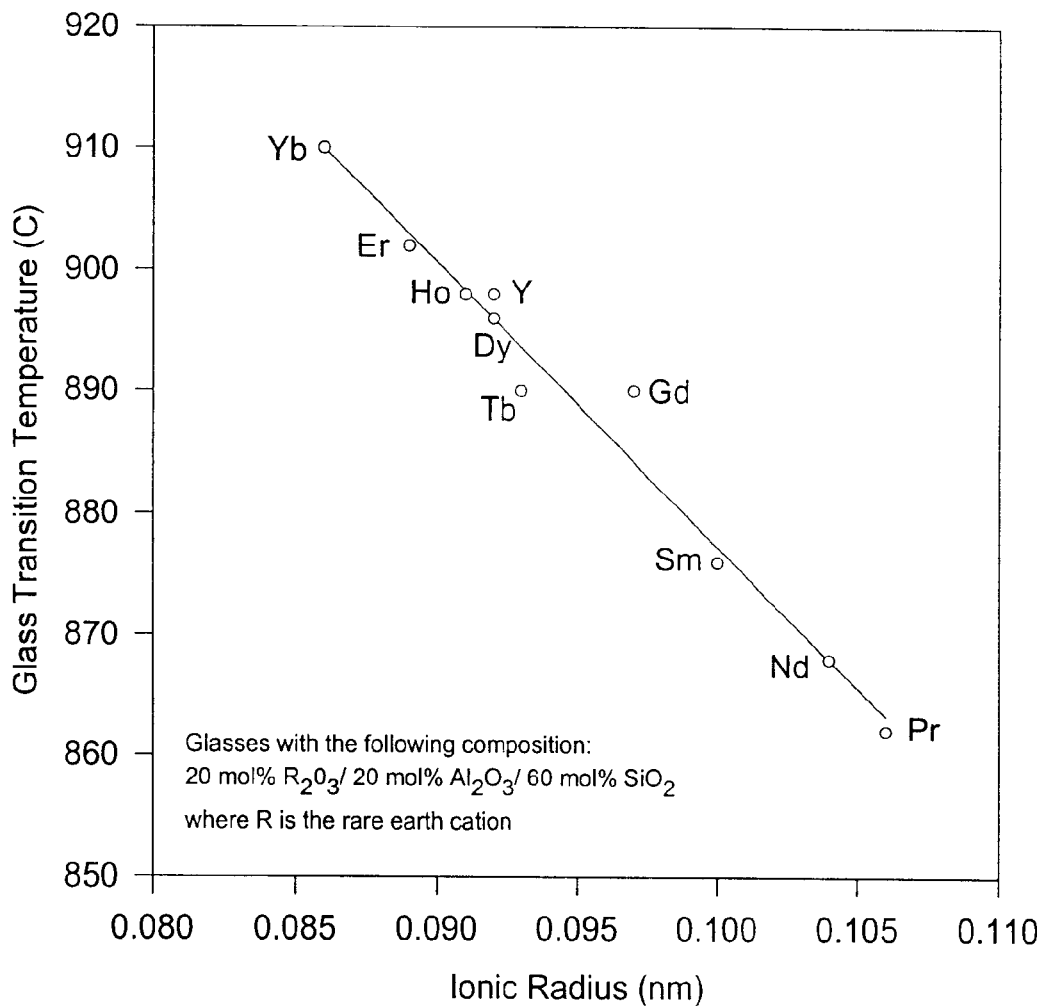
FIG. 10 is a graph showing the glass transition temperature of various rare earth aluminosilicate glasses as a function of ionic radius.

To overcome the aforementioned problems, a little known glass system, called rare earth aluminosilicates, was investigated. The rare earth elements include the following: Ce, Pr, Nd, Pm, Sm, Eu, Gd, Tb, Dy, Ho, Er, Tm, Yb, and Lu. Yttrium is often included in such discussions because it behaves much like a rare earth element even though it is technically not. For the purposes of this application the term "rare earth elements" is intended to include yttrium. Binary systems of silica and rare earth oxides are notoriously difficult to manufacture because of liquid immiscibility and phase separation. Ternary systems, however, are amenable to glass formation and fabricating. One of the salient characteristics of rare earth aluminosilicate glasses is their higher glass transition temperature (see FIG. 10 which is from Shelby, J. E., Kohli, J. T., "Rare Earth Aluminosilicate Glasses" J. American Ceramic Soc. Vol 73, No. 1. 1990, pp. 39–42.). It surprisingly has been found that such rare earth aluminosilicate glasses also have a low melt viscosity. Further, such glasses are quite fluid (see FIG. 9) at normal processing temperatures (1600–1700° C.) and bubble-free melts may therefore be obtained in relatively short times (in a matter of minutes typically). The high fluidity of these glasses, however, does significantly increase the propensity for crystallization. This characteristic affects the size of the slabs that may be cast from a melt.

The uniqueness of the rare earth aluminosilicate glasses stems from the rare earth cations. The high field strength of the rare earth modifier cations leads to highly disordered structures and significant variability in the bond angles and morphology of the silicon-oxygen tetrahedra in this class of glass. In essence, there is significantly more structural disorder in rare earth aluminosilicates glasses compared with alkali and alkaline earth aluminosilicates. Until recently it was not known that rare earth aluminosilicate glasses could be formed. The classical understanding of glass formation suggests that rare earth aluminosilicates should not form glasses at all.

Rare earth aluminosilicates contain significant levels of nonbridging oxygen atoms. Alkali aluminosilicates on the other hand contain very few nonbridging oxygens (for glasses with equimolar alkali oxide and alumina concentrations). It is also interesting to note that with yttria composition changes in yttria aluminosilicates, there is only a very small variation in the concentration of nonbridging oxygens. In yttria aluminosilicate glasses, it is believed that the high nonbridging oxygen concentrations are responsible for the high melt fluidity of these glasses as well as their low $T_g$ variation with yttria concentration.

Figure 11:
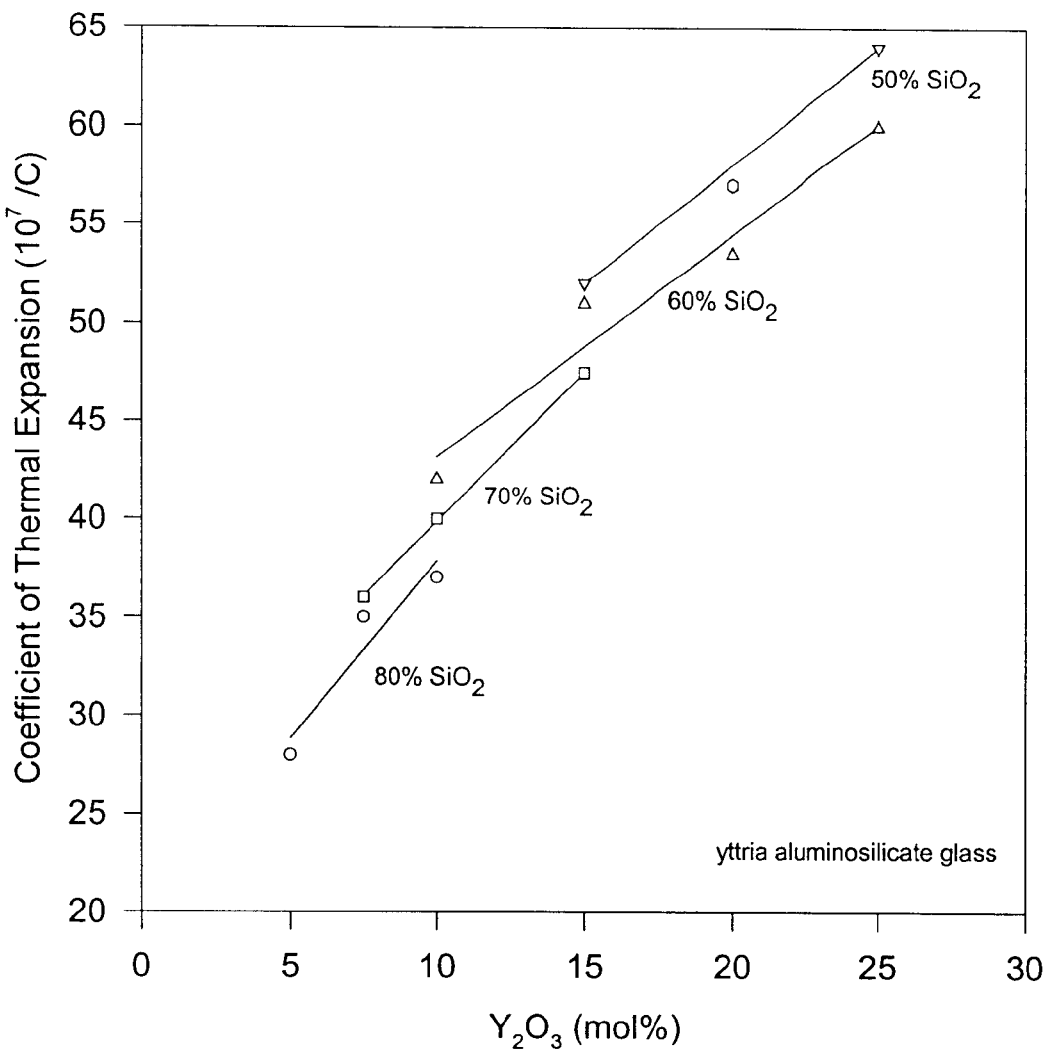
FIG. 11 is a graph showing the coefficient of thermal expansion of yttria aluminosilicate glass as a function of yttria composition.
Figure 12:
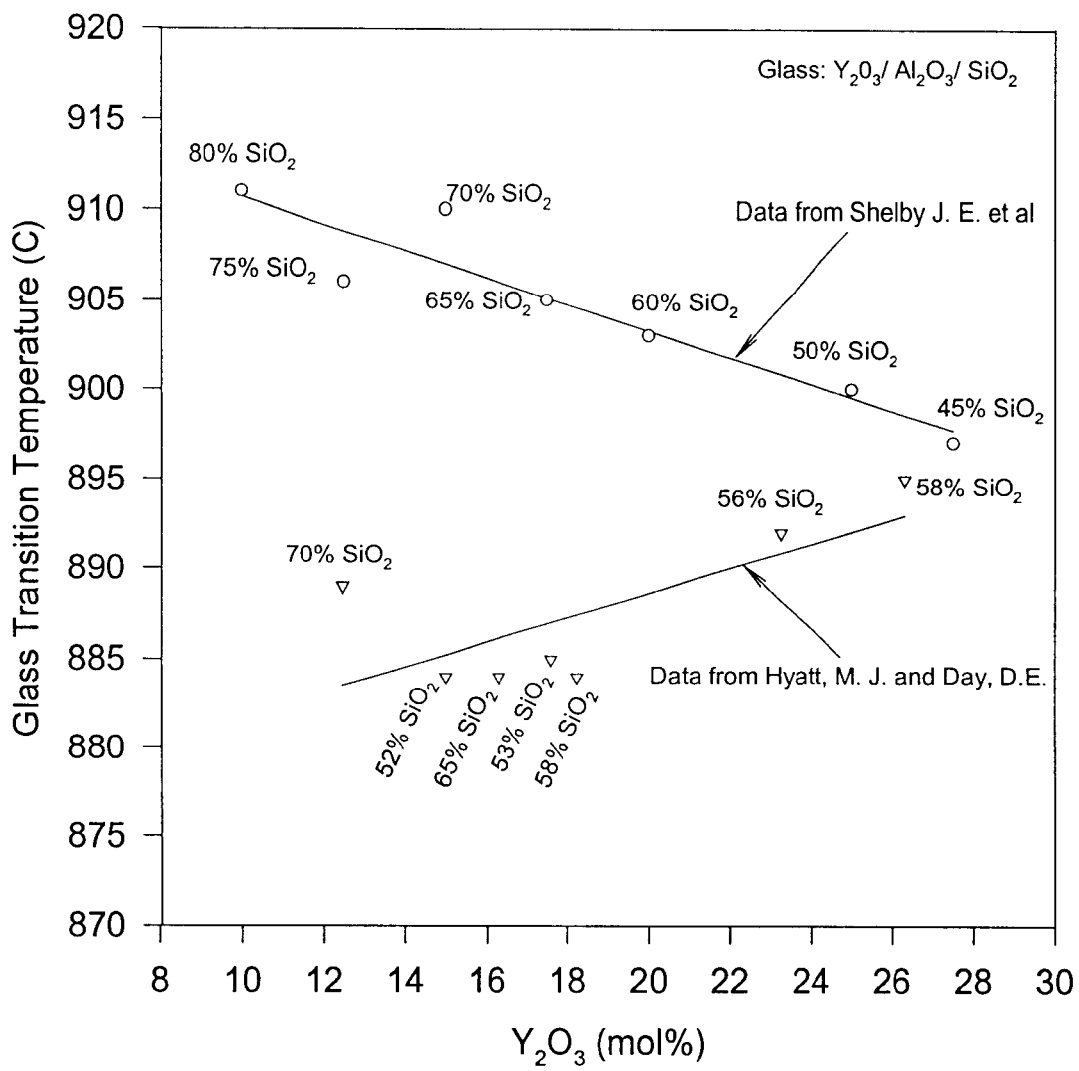
FIG. 12 is a graph showing the glass transition temperature of yttria aluminosilicate glass as a function of composition.

An yttria aluminosilicate glass, YAS-6, is a preferred glass for glass molds because of its combination of properties. Of the rare earth aluminosilicate glasses, the yttria aluminosilicate glasses have higher glass transition temperatures and lower coefficients of thermal expansion. Furthermore, yttria aluminosilicates have well behaved properties compared with other rare earth silicates. For example, the coefficient of thermal expansion increases generally linearly with yttria concentration from 25 to $70 \times 10^{-7}/°$ C. (see FIG. 11 which is from Shelby, J. E., et al., "Formation and Properties of Yttrium Aluminosilicate Glasses." Physics and Chemistry of Glasses, Vol. 33, No. 3, 1992, pp.93–98). Based on limited data, the CTE of other rare earth silicates varies widely and irregularly with composition. Similarly, the $T_g$ of yttria aluminosilicates is very stable with composition as shown in FIG. 12 (which is from Shelby J. E., et al., "Formation and Properties of Yttrium Aluminosilicate Glasses." Physics and Chemistry of Glasses, Vol. 33, No. 3, 1992, pp.93–98.). Therefore, while the method of the present invention may be practicable with other rare earth aluminosilicate glasses, some experimentation may be required to achieve the compositions of such glasses which will have the desired properties for a particular application.

Figure 14:
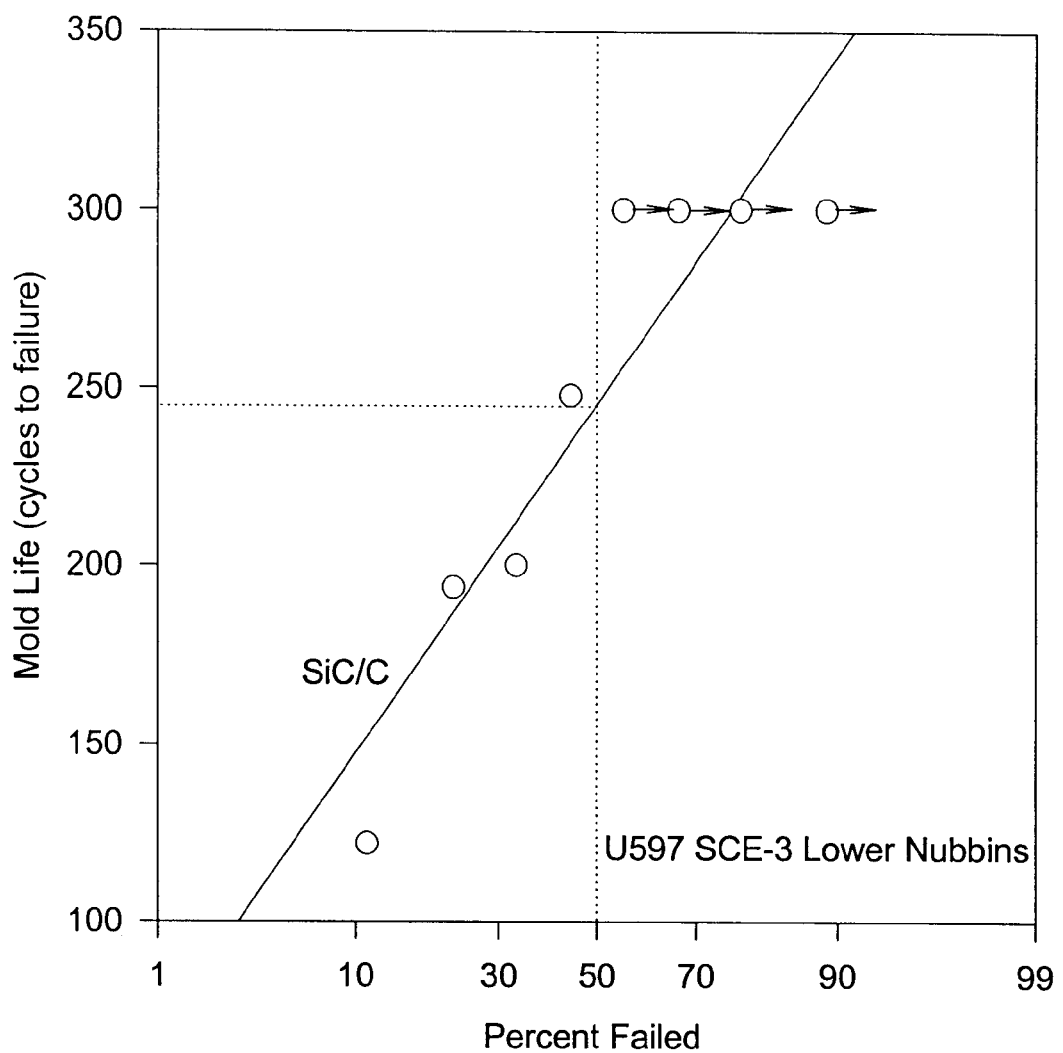
FIG. 14 is a probability plot showing the life of alkali aluminosilicate (SCE-3+5% $SiO_2$) glass molds coated with silicon carbide/carbon composite.

As previously mentioned, one of the difficulties with alkali aluminosilicate glasses is adhesion of the release coating. Traditionally a carbon-based release coating is used to prevent the molded lens from bonding to the tool (particularly crown glasses). Experiments have shown that when a carbon-based coating was applied directly to the surface of an alkali aluminosilicate mold (SCE3+5% $SiO_2$), the adhesion of this coating was very inconsistent. Some molds would have acceptable life (greater than 250 cycles) before the coating failed and some failed in only a few cycles (see FIG. 14). To correct this problem, a 1000 Å layer of silicon carbide was coated on the surface prior to the deposition of the carbon-based coating. Tools coated in this way have significantly improved life.

Figure 13:
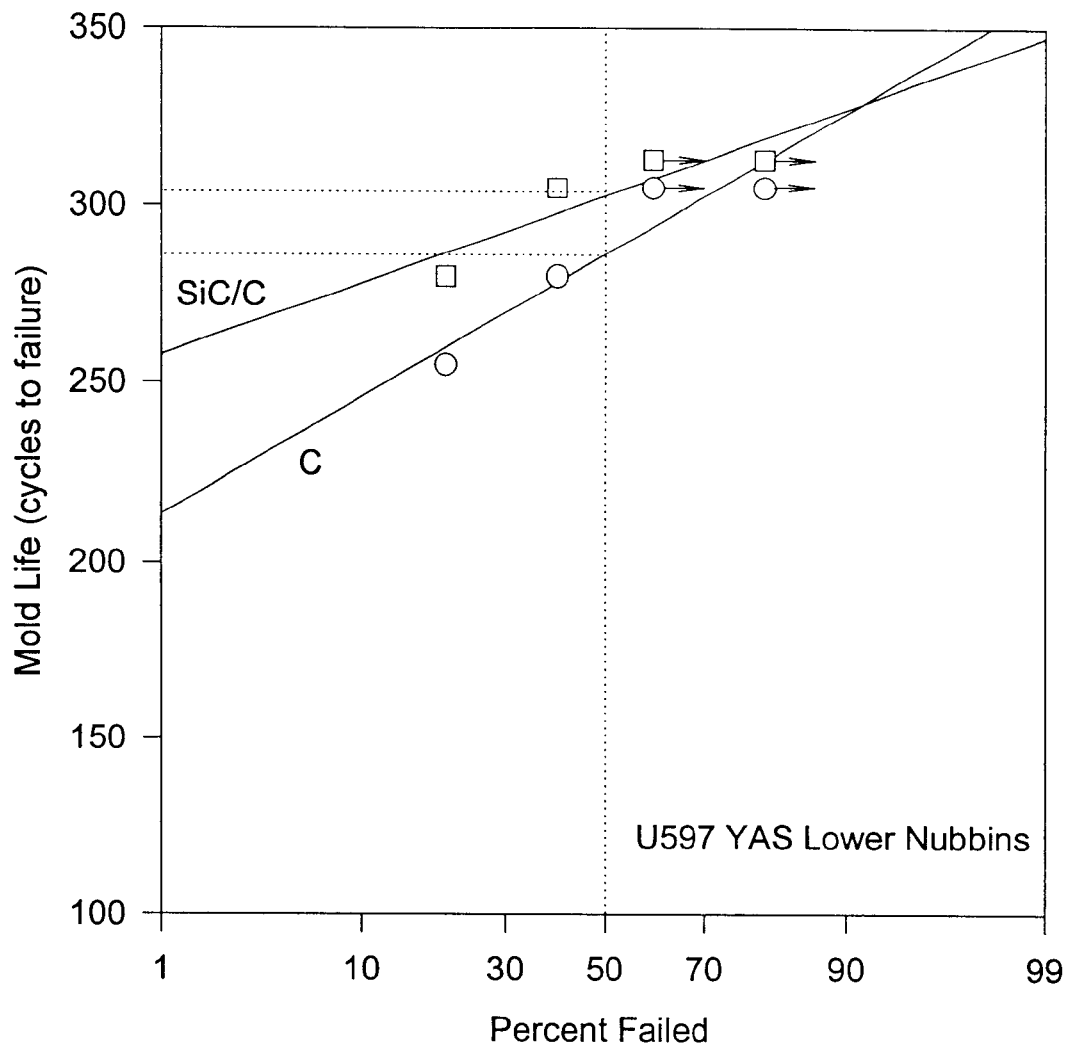
FIG. 13 is a probability plot showing the life of a yttria aluminosilicate (YAS-6) glass molds coated with either carbon or a silicon carbide/carbon composite.

It was, however, discovered that yttria aluminosilicate molds were much more receptive to carbon-based coatings. In early experiments, tools coated with carbon (by physical vapor deposition) lasted between 210 to 360 cycles. When a 1000 Å layer of silicon carbide was applied to the glass mold prior to the carbon-based coating, the coating life improved to 250 to 350 cycles (see FIG. 13). In simulated production runs, it is not uncommon for a tool to last more than 600 cycles before failing. When a tool does fail, it is generally because of scratches and other surface defects rather than coating adhesion. It is believed that the excellent hydrolytic stability as well as the absence of alkali in the yttria aluminosilicate glass enhances the coating adhesion and durability. This observation was further verified by comparing the adhesion of carbon films on borosilicate and fused silica glasses. In such studies, coatings always bonded well to the fused silica but not necessarily to the borosilicate.

In an exemplary application, biaspheric, double convex, digital camera lenses (6.96 mm diameter by 2.01 mm center thickness) were molded using upper and lower glass molds fabricated from a yttria aluminosilicate glass (YAS) as shown in Table 3. This lens was molded from Schott BK7 optical glass.

TABLE 3

Composition of YAS Mold Glass

| Material Identification | Glass Type | Composition (wt %) | | |
|---|---|---|---|---|
| | | $SiO_2$ | $Al_2O_3$ | $Y_2O_3$ |
| YAS-6 | Yttria aluminosilicate | 33 | 25 | 42 |

The properties of this glass are shown in Table 4.

TABLE 4

Thermal Characteristics of YAS Mold Glasses

| Material Identification | Linear thermal expansion coefficient ($\times 10^7/°$ C.) | Glass Transition Tg (° C.) | Maximum use temperature (° C.) ($10^{15}$ poise) | Molding Temperature (° C.) ($10^8$ poise) |
|---|---|---|---|---|
| YAS-6 | 55.8 | 850 | 824 | 1016 |

The glass working molds were molded using CVD silicon carbide master molds of the inverse shape. The silicon carbide master molds were fabricated using traditional diamond grinding and aspheric polishing techniques. The master tools were then coated with a suitable release agent. Cylindrical preforms were fabricated from YAS-6 glass and one end of each preform was polished by traditional means to a scratch rating of 10, and a dig rating of 5 per MIL-PRF-13830. The preforms were then coated with a pyrolytic release coating. To mold the upper and lower working molds from YAS-6, the coated preforms were placed in the molding apparatus (see FIG. 7) such that the polished end of the preform faced the master tool surface. The mold system was then enveloped in a nitrogen atmosphere and was heated to about 1020° C. Once the mold and the preform were heated to about 1020° C. the mold halves are slowly closed, molding the preform into the desired shape (see FIG. 8). The mold was then cooled and the glass mold was removed. The glass molds were then vacuum coated with 640 Å of silicon carbide and subsequently 1500 Å of carbon. The YAS-6 glass working molds were then placed in a molding machine and lenses were molded from Schott BK7 spherical preforms at 700° C. (a viscosity of about $10^8$ poise). Prior to molding the lenses, the Schott BK7 spherical preforms were coated with a pyrolytic release layer. After molding the pyrolytic release coating was removed from the surfaces of the lenses. The lenses were then optically centered by traditional methods and cleaned. Lenses produced in this manner were found to be suitable for the end use product.

From the foregoing it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

Parts List 10 mold assembly
12 lower mold housing
14 upper mold housing
16 hearth plate
18 spacer sleeve
20 mold super ring
22 cylindrical opening
24 upper annular shoulder
26 lower annular shoulder
28 master mold tool
30 annular flange
32 mold surface
34 mold cavity
35 slots
36 cylindrical member
38 pusher plate
40 working glass mold tool
42 mold surface
44 annular flange portion
100 mold assembly
112 lower mold housing
114 upper mold housing
116 hearth plate
118 spacer sleeve
120 mold super ring
122 cylindrical opening
124 upper annular surface
128 master mold tool
130 annular flange
132 mold surface
134 mold cavity
136 cylindrical member
138 pusher plate
140 recess
150 cylindrical preform
160 working mold tool
162 annular flange

What is claimed is:

1. A method for forming molding tools for molding glass optical elements therewith comprising the steps of:
   (a) formulating an yttria aluminosilicate glass to have a predetermined coefficient of thermal expansion, the yttria aluminosilicate glass having a viscosity of less than about $10^2$ poise at a temperature of less than about 1200° C.;
   (b) forming a working mold preform from the yttria aluminosilicate glass;
   (c) molding a working mold tool from the working mold preform, the working mold tool including a molded optical element forming surface, the working mold tool having a viscosity of at least about $10^{15}$ poise at a molding temperature of the glass optics to be molded therewith; and
   (d) molding a glass optical element with the molded optical element forming surface, the coefficient of thermal expansion and geometry of the glass optical element determining a desired range for the predetermined coefficient of thermal expansion of the yttria aluminosilicate glass.

2. A method for forming molding tools for molding glass optical elements therewith, the glass optical elements having molding temperatures in the range of from about 400° C. to about 825° C., the method comprising the steps of:
   (a) forming a working mold preform from an yttria aluminosilicate glass having a viscosity of less than about $10^2$ poise at a temperature of less than about 1200° C.; and (b) molding a working mold tool from the working mold preform, the working mold tool including a molded optical element forming surface, the working mold tool having a viscosity of at least about $10^{15}$ poise at a molding temperature of the glass optical elements to be molded therewith.

3. A method for forming molding tools for molding glass optical elements therewith, the glass optical elements having molding temperatures in the range of from about 400° C. to about 825° C., the method comprising the steps of:

(a) forming a working mold preform from a rare earth aluminosilicate glass having a viscosity of less than about $10^2$ poise at a temperature of less than about 1200° C. and having a $T_g$ that is at least about 50° C. greater than the molding temperature of the glass optical elements, the rare earth aluminosilicate glass having a coefficient of thermal expansion in the range of from about $25 \times 10^{-7}$/° C. to about $70 \times 10^{-7}$/° C.; and (b) molding a working mold tool from the working mold preform, the working mold tool including a molded optical element forming surface, the working mold tool having a viscosity of at least about $10^{15}$ poise at a molding temperature of the glass optical elements to be molded therewith.

4. A method as recited in claim 2 further comprising the step of:

molding glass optical elements with the molded optical element forming surface, the coefficient of thermal expansion and geometry of the glass optical element determining a desired range for the predetermined coefficient of thermal expansion of the yttria aluminosilicate glass.

5. A method as recited in claim 3 further comprising the step of:

molding glass optical elements with the molded optical element forming surface, the coefficient of thermal expansion and geometry of the glass optical element determining a desired range for the predetermined coefficient of thermal expansion of the rare earth aluminosilicate glass.

6. A method as recited in claim 4 further comprising the step of:

applying a carbon release coating to the molded optical element forming surface.

7. A method as recited in claim 5 further comprising the step of:

applying a carbon release coating to the molded optical element forming surface.

8. A method as recited in claim 1 wherein:

the coefficient of thermal expansion of the yttria aluminosilicate glass may be altered from about 25 to about $70 \times 10^{-7}$/° C. without significantly altering the glass transition temperature thereof.

9. A method as recited in claim 3 wherein:

the coefficient of thermal expansion of the rare earth aluminosilicate glass may be altered from about 25 to about $70 \times 10^{-7}$/° C. without significantly altering the glass transition temperature thereof.

10. A method as recited in claim 4 wherein:

the coefficient of thermal expansion of the yttria aluminosilicate glass may be altered from about 25 to about $70 \times 10^{-7}$/° C. without significantly altering the glass transition temperature thereof.

11. A method as recited in claim 1 wherein:

the coefficient of thermal expansion of the yttria aluminosilicate glass may be altered from about 25 to about $70 \times 10^{-7}$/° C. without altering the glass transition temperature thereof by more than about ±25° C.

12. A method as recited in claim 3 wherein:

the coefficient of thermal expansion of the rare earth aluminosilicate glass may be altered from about 25 to about $70 \times 10^{-7}$/° C. without altering the glass transition temperature thereof by more than about ±25° C.

13. A method as recited in claim 4 wherein:

the coefficient of thermal expansion of the yttria aluminosilicate glass may be altered from about 25 to about $70 \times 10^{-7}$/° C. without altering the glass transition temperature thereof by more than about ±25° C.

14. A method as recited in claim 8 wherein:

the coefficient of thermal expansion of the yttria aluminosilicate glass may be altered from about 25 to about $70 \times 10^{-7}$/° C. without significantly altering the temperature at which the yttria aluminosilicate glass has a viscosity of at least about $10^{15}$ poise.

15. A method as recited in claim 3 wherein:

the coefficient of thermal expansion of the rare earth aluminosilicate glass may be altered from about 25 to about $70 \times 10^{-7}$/° C. without significantly altering the temperature at which the rare earth aluminosilicate glass has a viscosity of at least about $10^{15}$ poise.

16. A method as recited in claim 4 wherein:

the coefficient of thermal expansion of the yttria aluminosilicate glass may be altered from about 25 to about $70 \times 10^{-7}$/° C. without significantly altering the temperature at which the yttria aluminosilicate glass has a viscosity of at least about $10^{15}$ poise.

* * * * *